(12) United States Patent
Kassaei (10) Patent No.: US 8,768,783 B2
(45) Date of Patent: Jul. 1, 2014

(54) SYSTEMS AND METHODS FOR TRANSFORMATION OF SUBMITTED LISTINGS

(75) Inventor: Farhang Kassaei, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/340,306

(22) Filed: Dec. 29, 2011

(65) Prior Publication Data

US 2013/0006808 A1    Jan. 3, 2013

Related U.S. Application Data

(63) Continuation of application No. 13/173,697, filed on Jun. 30, 2011.

(51) Int. Cl.
*G06Q 30/00* (2012.01)

(52) U.S. Cl.
USPC ........................................ 705/26.25; 705/26.1

(58) Field of Classification Search
USPC ..................... 705/26.1, 27.1, 26.25
See application file for complete search history.

(56) References Cited

U.S. PATENT DOCUMENTS

| | | |
|---|---|---|
| 2003/0229544 A1 | 12/2003 | Veres |
| 2004/0204990 A1 | 10/2004 | Lee et al. |
| 2005/0033683 A1 | 2/2005 | Sacco et al. |
| 2008/0077476 A1* | 3/2008 | McElhiney et al. ............. 705/10 |
| 2008/0172329 A1* | 7/2008 | Kaufman et al. ............... 705/40 |
| 2013/0006815 A1 | 1/2013 | Kassaei |

FOREIGN PATENT DOCUMENTS

| | | |
|---|---|---|
| CN | 103635921 A | 3/2014 |
| WO | WO-2013003674 A1 | 1/2013 |

OTHER PUBLICATIONS

Editors, B., "StoreBusters launches groundbreaking online product exposure service; marketplace manager obsoletes traditional online marketing and advertising systems," Business Wire Jan. 22, 2001.*
"U.S. Appl. No. 13/173,697, Non Final Office Action mailed Aug. 10, 2012", 11 pgs.
"U.S. Appl. No. 13/173,697, Response filed Nov. 12, 2012 to Non Final Office Action mailed Aug. 10, 2012", 10 pgs.
"International Application Serial No. PCT/US2012/044816, Search Report mailed Sep. 21, 2012", 2 pgs.
"International Application Serial No. PCT/US2012/044816, Written Opinion mailed Sep. 21, 2012", 4 pgs.
Steiner, I, "eBay Changes Duplicate-Listing Policy", AuctionBytes Blog. Retrieved from the Internet: <URL:http://www.ecommercebytes.com/C/abblog/blog/ph?/pl/2010/9/1285093887.html>, (Sep. 21, 2010), 12 pgs.

(Continued)

*Primary Examiner* — Brandy A Zukanovich
(74) *Attorney, Agent, or Firm* — Schwegman Lundberg & Woessner, P.A.

(57) ABSTRACT

Systems and methods for transformation of submitted listings are described. An example system comprises a policy module to receive a listing describing an item for sale and to determine that the listing does not comply with one or more marketplace policies of a marketplace. The marketplace publishes listings describing items for sale, and the one or more marketplace policies are based on item characteristics or listing characteristics. A presentation module, responsive to the determination that the listing does not comply with the one or more marketplace policies, transforms the listing according to the one or more marketplace policies and publishes the transformed listing in the marketplace.

19 Claims, 9 Drawing Sheets

(56) References Cited

OTHER PUBLICATIONS

Steiner, I, "eBay Sellers Test New Dupes-Policy Compliance Tools", AuctionBytes Blog. Retrieved from the Internet: <URL: http://www.ecommercebytes.com/C/abblog/blog.pl?/pl/2010/10/1286204338.html>, (Oct. 4, 2010), 5 pgs.

"U.S. Appl. No. 13/173,697, Response filed Dec. 19, 2013 to Non Final Office Action mailed Sep. 19, 2013", 10 pgs.

"U.S. Appl. No. 13/173,697, Final Office Action mailed Feb. 8, 2013", 11 pgs.

"U.S. Appl. No. 13/173,697, Non Final Office Action mailed Sep. 19, 2013", 9 pgs.

"U.S. Appl. No. 13/173,697, Response filed May 8, 2013 to Final Office Action mailed Feb. 8, 2013", 10 pgs.

U.S. Appl. No. 13/173,697, Final Office Action mailed Mar. 26, 2013, 10 pgs.

U.S. Appl. No. 13/173,697, Response filed May 6, 2014 to Final Office Action mailed Mar. 26, 2014, 10 pgs.

European Application Serial No. 12803582.1, Office Action mailed Feb. 21, 2014, 3 pgs.

\* cited by examiner

FIG. 9

SYSTEMS AND METHODS FOR TRANSFORMATION OF SUBMITTED LISTINGS

RELATED APPLICATIONS

This application is a Continuation of U.S. application Ser. No. 13/173,697, filed on Jun. 30, 2011, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc., All Rights Reserved.

TECHNICAL FIELD

This patent document pertains generally to network communications, and more particularly, but not by way of limitation, to a multi-tenancy e-commerce platform.

BACKGROUND

In e-commerce marketplaces, one or more sellers publish listings describing items for sale. The listings may include textual descriptions of the item for sale and pictures of the items for sale. The seller may offer the item for a fixed price or may auction the item. In some instances, a seller may post more than one listing to describe a single item for sale or may post the same listing in multiple e-commerce marketplaces. This practice may lead to a situation where the seller has sold a single item to more than one buyer.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Sellers who use e-commerce marketplaces to sell items typically maintain an inventory recording the items and the number of those items that the seller has available for sale. Additionally, the sellers generate one or more listings describing an item recorded in the inventory. The seller may submit a listing to one or more marketplaces. The marketplace publishes or distributes the listing to one or more potential buyers. A marketplace may publish listings received from just one seller or from a plurality of sellers. Examples of marketplaces include websites that publish listings of one seller (e.g., a website for a brick and mortar store) and websites that publish listings of more than one seller (e.g., an auction website like eBay).

In some instances, the user may sell fungible items having a description that describes more than one instance of the item. As used herein, the term "product" is used to refer collectively to all instances of the item and includes a generic description that describes one instance of the item. The description may be or include a stock-keeping unit (SKU) number, bar code, or other identifying code assigned to the product. The description may include characteristics of the product such as make, model number, color, size, available colors, available sizes, and the like.

Various embodiments include systems and methods for providing a multi-tenancy e-commerce platform. "Multi-tenancy" refers to an ability to allow more than one e-commerce marketplace to participate in an e-commerce platform. An e-commerce platform allows marketplaces to receive listings from multiple sellers and determine whether to publish the received listings according to a framework as described herein. An e-commerce platform may provide services to one or more of the federated marketplaces. The provided services may include, but are not limited to, listing publishing services, checkout services, payment services, shipping services, inventory management services, and dispute resolution services. A user may generate multiple listings for an item or product where each listing is tailored to a particular marketplace. A distribution scheduler allows a user to provide a schedule dictating when various listing are to be delivered to various marketplaces. The marketplaces each include a decision system that allows the marketplaces to determine whether to actually list the received listing or to forward the listing to another marketplace.

Figure 1:
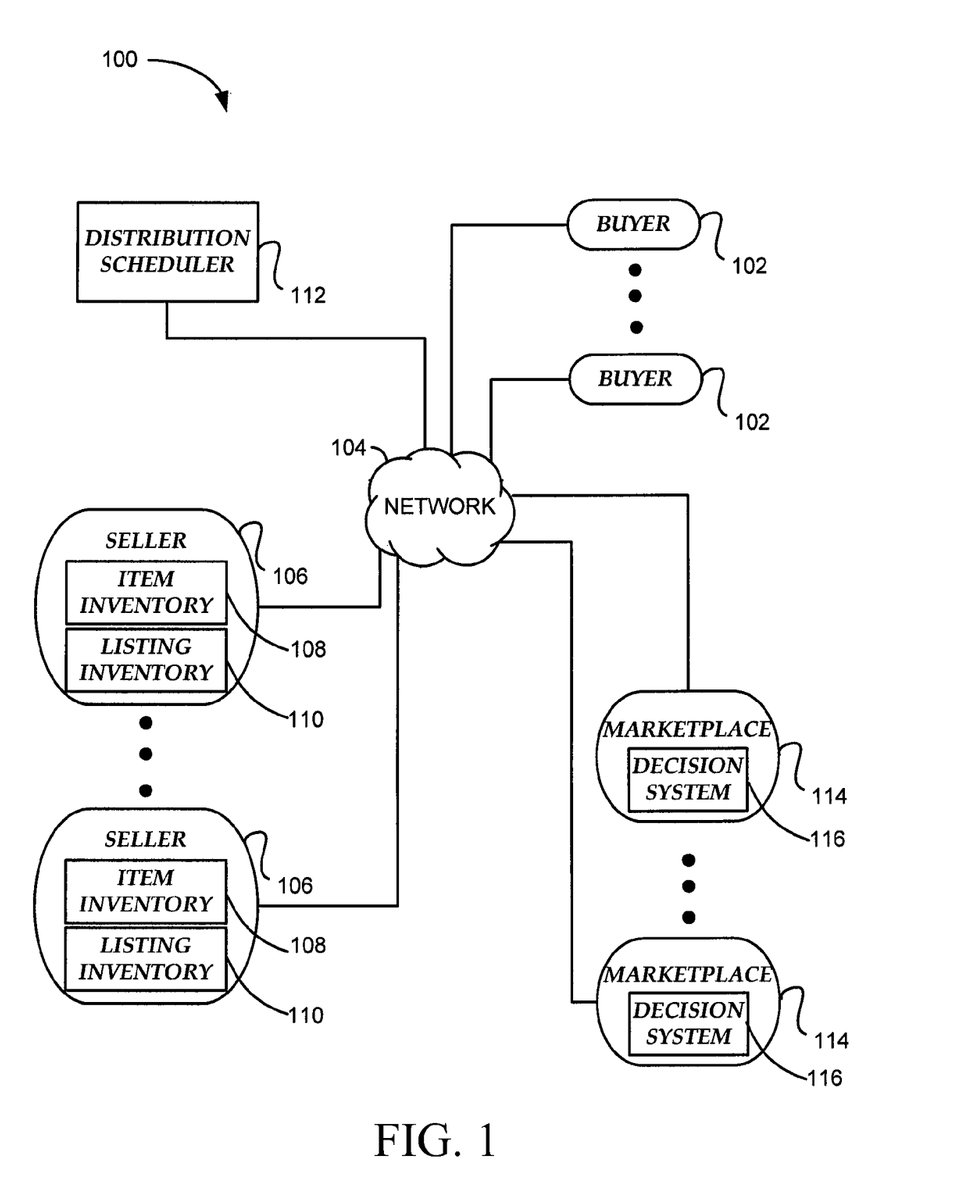
FIG. 1 is a network diagram depicting an example environment in which various embodiments may be practiced.

FIG. 1 is a network diagram depicting an example environment 100 in which various embodiments may be practiced. The respective components to the example environment 100 may be implemented as part of a distributed computing environment, a cloud computing environment, or another type of networking environment.

The example environment 100 comprises one or more buyers 102. A buyer 102 may be a client device used by a user to access a network 104. A user acting as a buyer 102 does not necessarily have any items listed for sale. A buyer 102 may access the network 104 (e.g., the Internet) to view published listings describing items for sale.

A seller 106 may be a client device used by a user to access the network 104. The seller 106 may access the network 104 to generate and publish listings describing items for sale. The seller 106 is distinguishable from a buyer 102 as including an item inventory 108 and a listing inventory 110. In some instances, the seller 106 may act as a buyer 102.

An item inventory 108 is a record of one or more items that may be for sale by the seller 106. The item inventory 108 may identify a quantity of items corresponding to a product description available for sale. In some instances, the items may be identified by a SKU number or other product identifier. The item inventory 108 may be maintained by the individual sellers 106. In other instances, the item inventories 108 of the respective sellers 106 may be aggregated into a centralized item inventory accessible by the sellers 106.

A listing inventory 110 includes or provides access (e.g., via a link or pointer) to one or more listings corresponding to the items for sale in the item inventory 108. Each item for sale in the item inventory 108 may be described by one or more listings in the listing inventory 110 (?). Some listings may be accessible even if there is no corresponding item for sale recorded in the item inventory 108 (e.g., the item is sold-out or discontinued). The listings may be mapped to items recorded in the item inventory 108 by a product identifier (e.g., a SKU code), a seller identifier identifying the seller, an item identifier determined by the seller, or any combination of these identifiers. Each listing may be identified using a listing identifier or according to the items described by the listing. The listing inventory 110 may be maintained by the individual sellers 106. In other instances, the listing inventories 110 of the respective sellers 106 may be aggregated into a centralized listing inventory accessible by the respective sellers 106.

A distribution scheduler 112 is depicted as a separate entity but may, alternatively, be hosted by the sellers 106. A distribution scheduler 112 is configured to receive and manage distribution schedules generated by one or more sellers 106. A distribution schedule dictates if and when a particular listing is sent to a marketplace (e.g., marketplace 114) for publication. The distribution schedule may indicate one or more conditions to be satisfied before a particular listing is sent to a particular marketplace. The distribution schedule may include decision-making logic to, for example, select an item for sale from a number of items for sale recorded in the item inventory 108, select a listing from a number of generated listings mapped to a particular item in the listing inventory 110, to select a marketplace 114 from a number of marketplaces 114, to determine when to deliver the listing to a respective marketplace, and the like.

A marketplace 114 is an e-commerce marketplace that publishes listings describing items for sale by one or more sellers. The marketplace 114 may provide a number of services to users acting as buyers and sellers such as a shopping cart, a check-out service, a payment or billing service, a shipping calculator, a reputation scoring service, and the like. The marketplace 114 may further comprise a decision system 116. Upon receipt of a listing from a seller 106 or a distribution scheduler 112, the decision system 116 is configured to determine whether to accept the listing, reject the listing, or forward the listing to another marketplace based on one or more marketplace policies 208.

When the listing is published in the marketplace 114, the marketplace 114 may access the item inventory 108 of the seller 106 to determine if the item is sold out or to update a quantity available. The marketplace 114 may access the item inventory 108 based on a distribution schedule, a threshold number of items sold via the marketplace 114, each time the item is sold via the marketplace 114, periodically (e.g., once per day), or prior to confirming a transaction initiated by the buyer 102. If an item is sold-out, or if no items are available, the marketplace 114 may automatically remove the listing. To republish the listing, the seller 106 may be required to resubmit the listing via the distribution scheduler 112. In other instances, the marketplace 114 may access the listing inventory 108 again and automatically re-publish the listing if more items become available. The marketplace 114 may access the listing inventory 108 periodically or based on a date defined by the seller 106.

Figure 2:
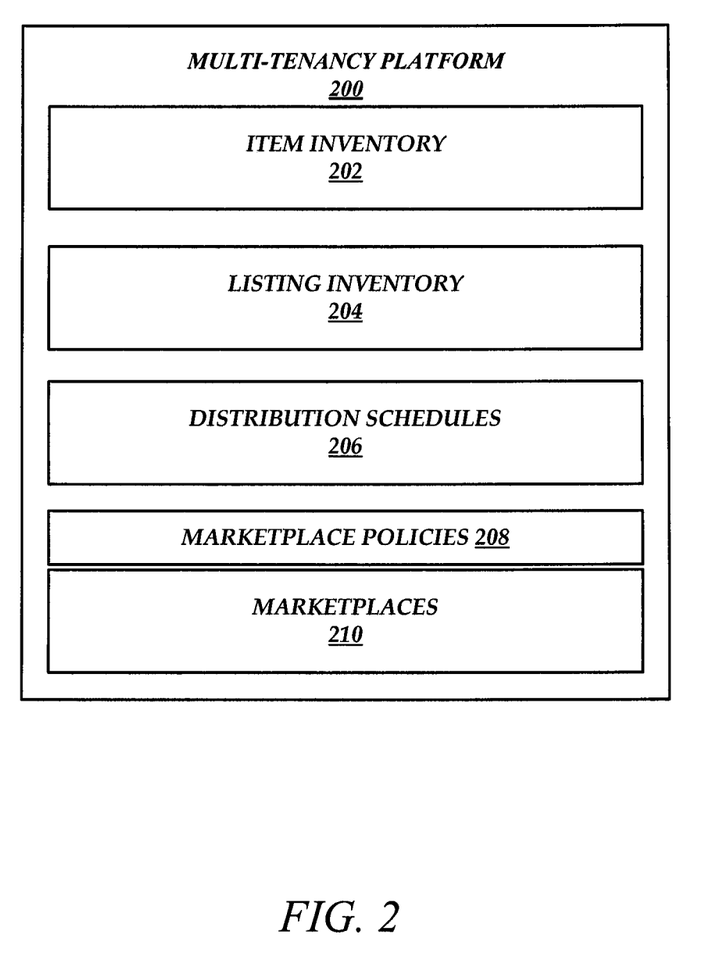
FIG. 2 is a block diagram of a multi-tenancy platform according to various embodiments.

FIG. 2 is a block diagram of a multi-tenancy platform 200 according to various embodiments. The multi-tenancy platform 200 may be implemented in software, hardware, or a combination of software and hardware. The multi-tenancy platform 200 may be distributed over a network or implemented in a cloud computing environment.

The item inventory 202 may be a copy of the item inventories 108 stored at each respective seller 106 or may be an aggregated item inventory maintained by the multi-tenancy platform 200. An aggregated item inventory may track an overall inventory regardless of seller or may track inventory according to seller.

The listing inventory 204 may be a copy of the listing inventories 110 stored at each respective seller 106 or may be a product listing inventory that includes listings that describe products available for sale from more than one seller 106. The listings in the product listing inventory may be available to the sellers 106 to add to the listing inventories 110, to select as default listings for items available for sale at one or more marketplaces 114, or to modify before publishing to one or more marketplaces 114. A product listing inventory may be used within the multi-tenancy platform 200 as a default listing for items delivered to marketplaces that have not been previously assigned a listing by the seller. In some instances, the marketplace 114 may have a policy that mandates that an item for sale in the marketplace 114 be presented using a particular listing available in the product listing inventory.

The listings stored in the listing inventory 204, including those stored in the listing inventories 110, may include one or more fields that can be filled based on information about a particular instance of a product. For example, an item inventory 202 may indicate that a seller has a certain number of items corresponding to a product. Some of those items may be differentiated based on a characteristic such as condition, color, size, or the like, depending on the product description. The listings for those items may have corresponding fields to indicate the condition, color, or size of the item for sale.

The distribution schedules 206 include a copy of the distribution schedules generated by the respective sellers 106 and the distribution scheduler 112. The distribution schedules 206 may be linked to the item inventory 108 and the listing inventory 110 of the respective sellers. By linking the distribution schedules 206 to the inventories 108 and 110, the sellers 106 can avoid posting listings in marketplaces when the item is unavailable or sold-out. The distribution schedules 206 may, for each scheduled delivery, identify a listing inventory 110 of the seller, at least one listing within the listing inventory 110 to be delivered, identify an item inventory of the seller, identify at least one item within the item inventory 110 that is described by the listing, and identify one or more marketplaces 114 where the listing is to be delivered. The distribution schedules 206 may further indicate one or more conditions that determine which item is to be removed from publication by the marketplace 114, such as an expiration time, a threshold number of items remaining, a quota to be met by the marketplace 114, or the like. In some instances, the distribution schedules 206 may indicate one or more conditional statements to be evaluated before delivering the listing to the marketplace 114. Some conditions may include, for example, a minimum number of items remaining in the item inventory.

Marketplace policies 208 are generated for the respective marketplaces 114 by an administrator of the marketplace and are accessed by the respective decision system 116 of the marketplace 114. The decision system 116, upon receiving a listing from the seller 106 or the distribution scheduler 112, determines whether to publish the listing in the marketplace 114, to not publish the listing in the marketplace 114, or to forward the listing to another marketplace 114. The marketplace policies 208 may be used by the decision system 116 (?) to evaluate the listing based on a characteristic of the item for sale or of the listing. Characteristics of the item that may be evaluated include price, condition, color, trademark or service mark, size, quantity remaining, product reviews or ratings, or the like. Characteristics of the listing may include size in memory, published size in a graphical user interface, format, layout, the presence of images or video, sale format (e.g., fixed price or auction), listing expiration, identity of the seller, reputation of the seller, or the like. The marketplace policies 208 may be published to the sellers 106.

The marketplaces 210 (e.g., a marketplace 114) publish the listings from the listing inventory 204 that have been delivered by the sellers 114 and that are compliant with the marketplace policies 208. The marketplaces 210 provide one or more services to the sellers 114. The marketplaces 210 may, in turn, have one or more of these services provided by the e-commerce platform 200.

Figure 3:
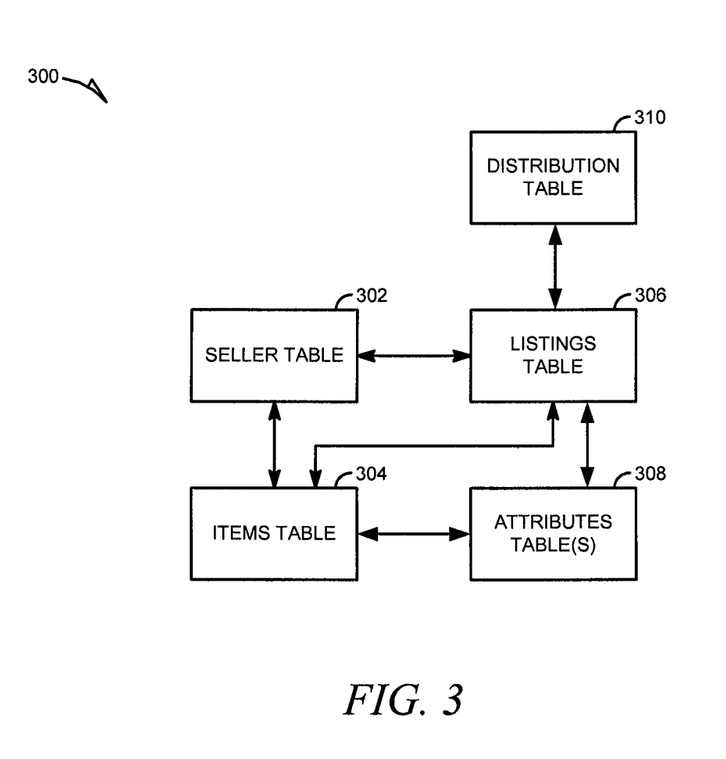
FIG. 3 is a high-level entity-relationship diagram, illustrating various tables that may be maintained as part of the multi-tenancy platform.

FIG. 3 is a high-level entity-relationship diagram illustrating various tables 300 that may be maintained as part of the multi-tenancy e-commerce platform 200. The tables 300 comprise a seller table 302 that identifies the sellers 106 that publish listings using the multi-tenancy e-commerce platform 200. An items table 304 identifies the items or products available for sale by the sellers 106. A listings table 306 identifies the listings that the sellers 106 have generated or published using the multi-tenancy e-commerce platform 200. An attributes table 308 identifies attributes or characteristics of the items or products identified in the items table 304. A distribution table 310 identifies the listings that are scheduled to publish or that have been published in the multi-tenancy e-commerce platform 200.

Figure 4:
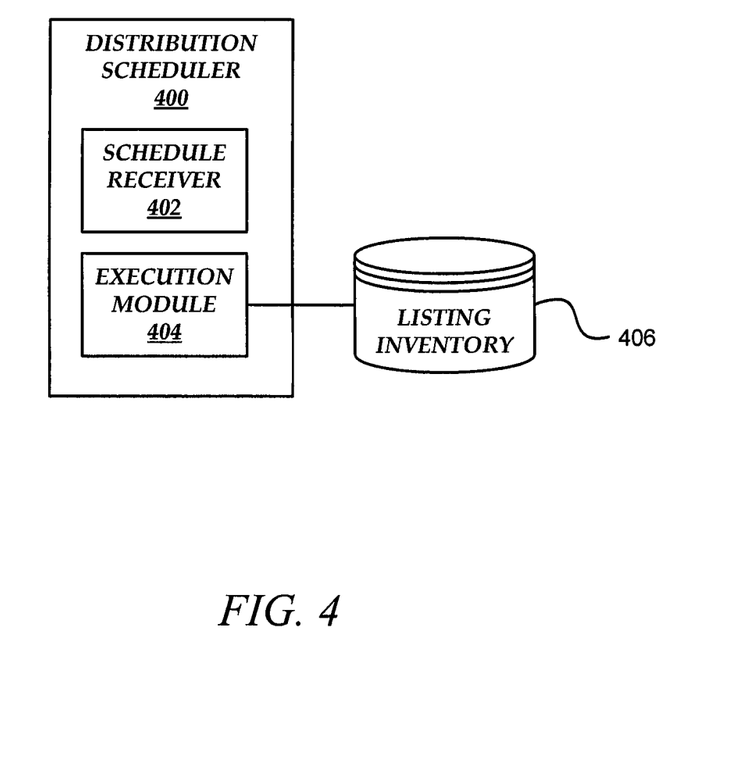
FIG. 4 is a block diagram illustrating a distribution scheduler according to various embodiments.

FIG. 4 is a block diagram illustrating a distribution scheduler 400 according to various embodiments. The distribution scheduler 400 may be the distribution scheduler 112 or may reside at the respective sellers 106. The distribution scheduler 400 may comprise one or more hardware or software modules such as a schedule receiver 402 and an execution module 404.

The schedule receiver 402 may receive one or more distribution schedules from the seller 106. The distribution schedule includes a distribution record of when a listing will be delivered to a marketplace for publication. The distribution record may include a listing identifier, an item identifier, a marketplace identifier, or a date and time for submission.

In some instances, the schedule receiver 402 may provide one or more interfaces through which to receive the distribution schedule from the seller 106. In some instances, the seller 106 may upload a previously generated schedule via an application program interface (API) provided by the schedule receiver 402. In other instances, the schedule receiver 402 may provide one or more graphical user interfaces (GUIs) to the seller 106 via the network 104 from which the distribution schedule can be generated.

The execution module 404 executes the distribution schedule by determining when to deliver a listing to a marketplace 114, accessing the listing from a listing inventory, and delivering the listing to the marketplace 114. The execution module 404 may evaluate one or more conditions stored in the distribution schedule or as part of a listing stored in the listing inventory before delivering the listing to the marketplace 114. For example, the execution module 404 may determine, based on a communication with the item inventory 114 that records the item described by the listing that a threshold quantity of the goods are available. In other instances, the time of the delivery may be determined based on one or more conditions.

The distribution scheduler 400 may further be communicatively connected to a listing inventory 406 of the seller 106. The listing inventory 406 may be the listing inventory 110 or the listing inventory 204. When the execution module 404 determines that the time to deliver the listing to a particular marketplace has arrived, the execution module 404 retrieves the listing from the listing inventory 406 and delivers the listing.

Figure 5:
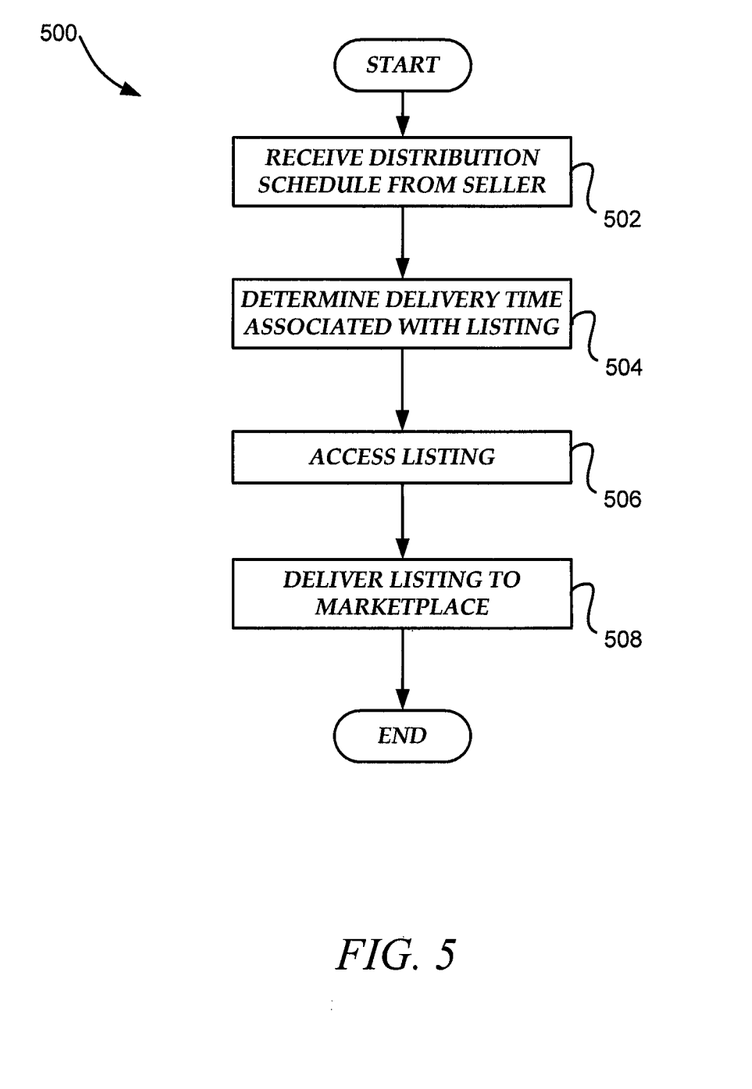
FIG. 5 is a flowchart illustrating a method to schedule and deliver a listing to a marketplace according to various embodiments.

FIG. 5 is a flowchart illustrating a method 500 to schedule and deliver a listing to a marketplace 114 according to various embodiments. The method 500 may be performed by the distribution scheduler 400. The method 500 may be performed by any of the modules, logic, or components described herein.

In an operation 502, the distribution schedule is received from the seller 106. The distribution schedule indicates at least when to deliver one or more listings to one or more marketplaces 114.

In an operation 504, a delivery time associated with one or more of the listings is determined. The delivery time may be based on a date and time, a number of items remaining, a number of items previously sold via a particular marketplace (e.g., if a quota has been met by the marketplace), or the like. In some instances, the delivery time may be expressed as a conditional statement, where unless one or more conditions are met, the listing is not delivered to a marketplace or is instead delivered to an alternate marketplace. For example, a seller can specify that a new batch of item should be delivered to a marketplace only if a previous batch of items described by the listing were sold at a certain price or certain velocity (number of items per time period).

In an operation 506, when the delivery time has arrived as determined based on the distribution schedule, the listing is accessed from the listing inventory 110 or the listing inventory 204 accessed using a listing identifier and/or other information recorded in the distribution schedule. In an operation 508, the listing is delivered to the marketplace 114 via the network 104.

Figure 6:
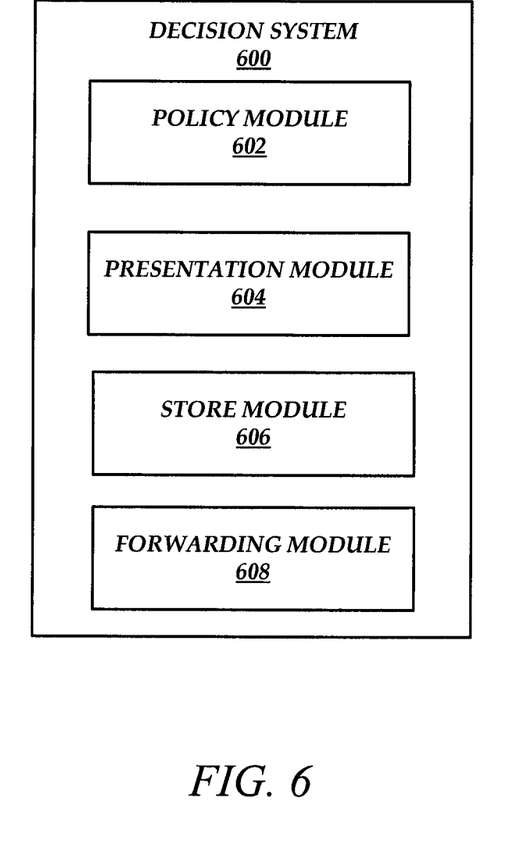
FIG. 6 is a block diagram illustrating a decision system according to some embodiments.

FIG. 6 is a block diagram illustrating a decision system 600 according to some embodiments. The decision system 600 may be an instance of a decision system 116 residing at a marketplace 114. The decision system 600 may comprise one or more hardware or software modules.

A policy module 602 accesses the marketplace policies 208 of the marketplace 114 and evaluates a delivered listing in view of the marketplace policies 208. The marketplace policies 208 may be based on item characteristics, seller characteristics or listing characteristics. The evaluation of the delivered listing may include evaluating one or more conditional statements pertaining to the item characteristics or listing characteristics. In some instances, a listing characteristic may be a set of options or a range of values from which the marketplace 114 may select. For example, a marketplace 114 may set a marketplace policy to only carry a certain number of an item or a brand. If the number of received listings exceeds the certain number, the marketplace may reject one or more of the received listings. Further, a marketplace specializing in outdoor gear may reject items from a jewelry maker. The policy module 602 may determine that at least one option in the set of options or at least value in the range of values complies with the marketplace policy 208. In some instances, the policy module 602 may select an option of the set of option or a value of the range of values. If the listing does not comply with the marketplace policies 208, the listing is rejected by the marketplace 114 but may be forwarded to one or more other marketplaces 114 as will be discussed in more detail below.

A presentation module 604 transforms the listing for publication according to one or more marketplace policies. The transformation may include, for example, re-sizing the listing as it appears in a GUI, re-formatting a listing, adding marketplace information or fields (e.g., logos, copyright, required information) to the listing, changing the appearance or layout of the listing, changing the price of an item, adding a discount to the listing, adding an incentive program for points or rewards to the listing, associating the listing with one or more product reviews or seller reviews, adding the listing to a catalog, classifying or categorizing the listing, or the like. In some embodiments, the marketplace 114 may add a product description. Permission to transform the listing may be implicitly granted when the listing is delivered to the marketplace 114, may be included in the delivered listing, may be included as an option of a set of options or a value in a range of values included in the delivered listing, or may be granted by the seller 106 upon review of the transformed listing.

A store module 606 adds the listing to a virtual store of the seller 106 in the marketplace 114. In some instances, the marketplace 114 may allow sellers 106 to establish one or more virtual stores where the seller 106 may publish multiple listings. The virtual store may be an interface presented to potential buyers and include store information including, for example, the seller's name, logo, policies, contact information, reputation information, and the like. In some instances, the virtual store may operate to add the store's information to the listing or add links to the published listing to the store's information.

A forwarding module 608 forwards one or more listings to one or more other marketplaces 114. The forwarding module 608 identifies a listing to forward based on one or more marketplace policies. Any delivered listing may be forwarded, including those rejected by the marketplace 114. In some instances, a seller 106 may grant or deny permission to forward the listing at the time of delivery. The forwarding module 608 may notify the seller 106 that the delivered listing was forwarded to another marketplace 114.

Figure 7:
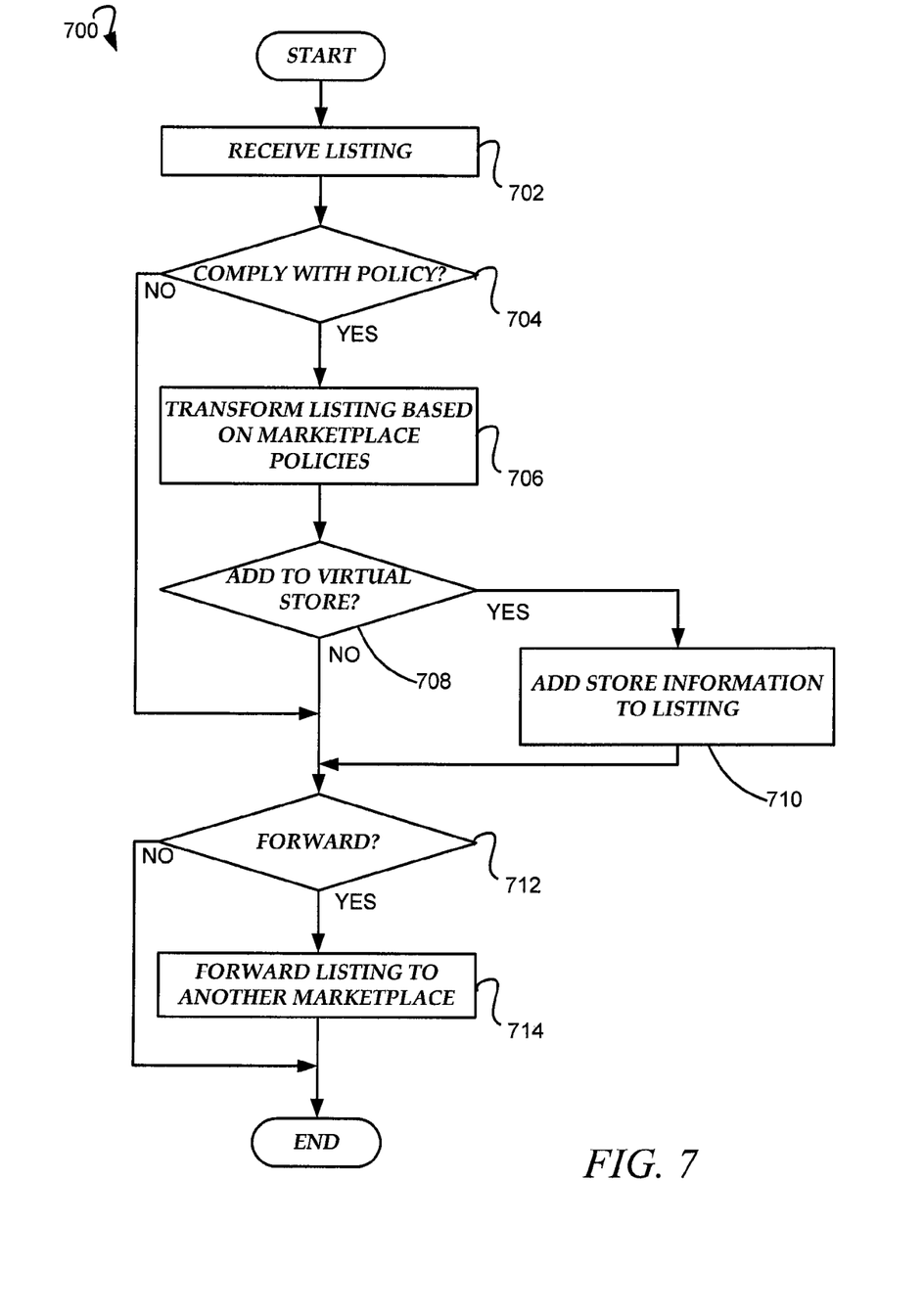
FIG. 7 is a flowchart illustrating a method to determine whether to publish a listing in a marketplace according to some embodiments.

FIG. 7 is a flowchart illustrating a method 700 for determining whether to publish a listing in a marketplace 114 according to some embodiments. The method 700 may be performed by any of the modules, logic, or components described herein.

In an operation 702, a listing is received from a seller 106 or a distribution scheduler 112 by the policy module 602. In an operation 704, the policy module 602 determines whether the listing complies, or can be transformed into compliance, with the marketplace policies 208 of the marketplace 114.

In an operation 706, if the listing complies with the marketplace policies 208, the presentation module 604 (or some other system residing at, or in electronic communication with, the marketplace 114) transforms the listing according to the marketplace policies 208. For example, the presentation module 604 may resize the listing and change font size of the text in the listing.

In an operation 708, the store module 606 (or some other system residing at, or in electronic communication with, the marketplace 114) determines whether to add the listing to a virtual store based, at least in part, on an identifier of the seller 106 associated with the listing. If the listing is to be added to the virtual store, in an operation 710, the store information of the virtual store is added to the listing.

In an operation 712, regardless of whether the listing is added to the virtual store, a determination is made as to whether to forward the listing to another marketplace. The listing that is forwarded may be the listing as delivered, the listing as transformed, or the listing as transformed with the store information. The determination to forward the listing may be based on one or more marketplace policies 208 of the forwarding marketplace 114. In an operation 714, the listing is forwarded to another marketplace. In some instances, a notification may be sent to the seller 106 indicating that the listing has been forwarded.

Figure 8:
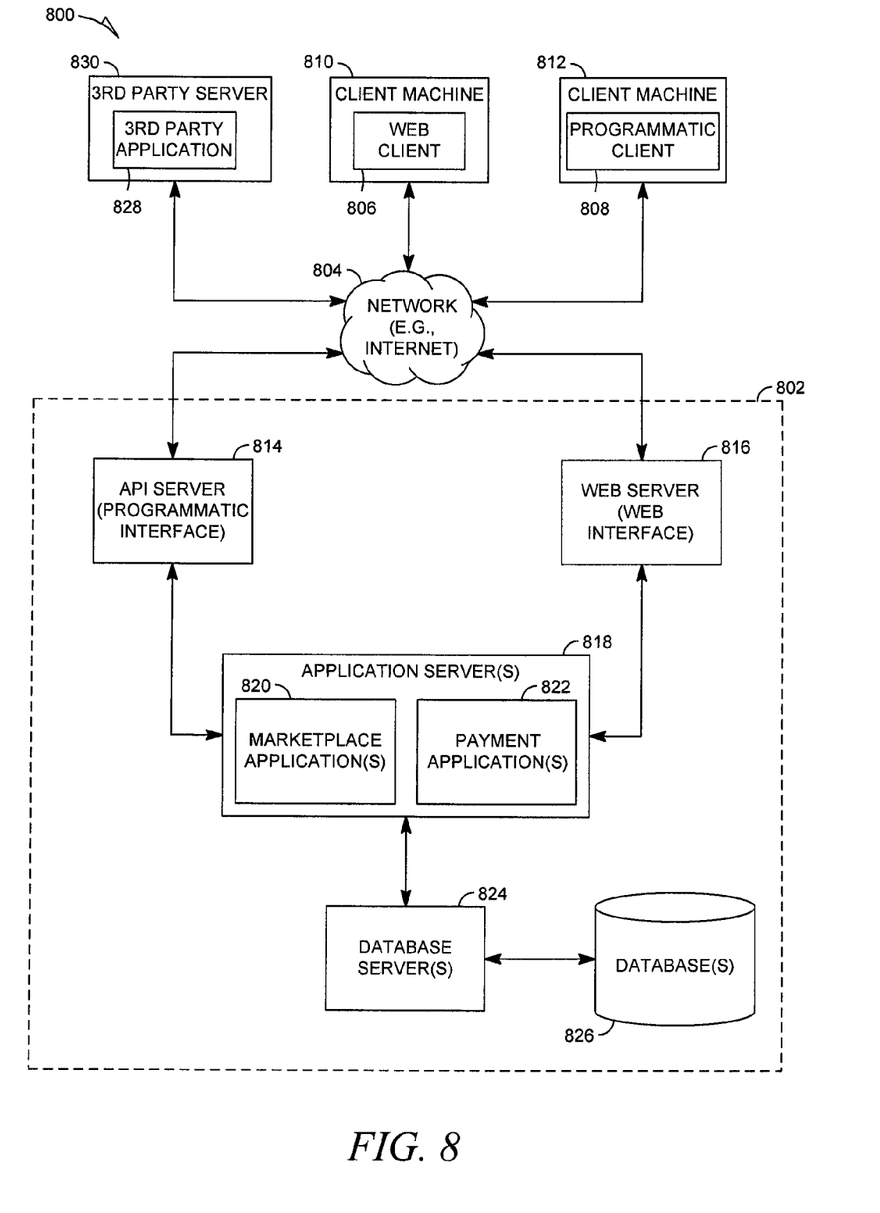
FIG. 8 is a network diagram depicting a client-server system, within which one example embodiment of a marketplace may be deployed.

FIG. 8 is a network diagram depicting a client-server system, within which one example embodiment of a marketplace may be deployed. A networked system 802, in the example forms of a network-based marketplace or publication system, provides server-side functionality, via a network 804 (e.g., the Internet or Wide Area Network (WAN)) to one or more clients. FIG. 8 illustrates, for example, a web client 806 (e.g., a browser), and a programmatic client 808 executing on respective client machines 810 and 812.

An Application Program Interface (API) server 814 and a web server 816 are coupled to, and provide programmatic and web interfaces respectively to, one or more application servers 818. The application servers 818 host one or more marketplace applications 820 and payment applications 822. The application servers 818 are, in turn, shown to be coupled to one or more databases servers 824 that facilitate access to one or more databases 826.

The marketplace applications 820 of a marketplace 114 may provide a number of marketplace functions and services to users that access the networked system 802. The payment applications 822 may likewise provide a number of payment services and functions to users. The payment applications 822 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 820. While the marketplace and payment applications 820 and 822 are shown in FIG. 8 to both form part of the networked system 802, it will be appreciated that, in alternative embodiments, the payment applications 822 may form part of a payment service that is separate and distinct from the networked system 802.

Further, while the system 800 shown in FIG. 8 employs a client-server architecture, the present invention is, of course, not limited to such an architecture, and could equally well find application in a distributed, or peer-to-peer, architecture system, for example. The various marketplace and payment applications 820 and 822 could also be implemented as standalone software programs, which do not necessarily have networking capabilities.

The web client 806 accesses the various marketplace and payment applications 820 and 822 via the web interface supported by the web server 816. Similarly, the programmatic client 808 accesses the various services and functions provided by the marketplace and payment applications 820 and

822 via the programmatic interface provided by the API server 814. The programmatic client 808 may, for example, be a seller application (e.g., the TurboLister application developed by eBay Inc., of San Jose, Calif.) to enable sellers to author and manage listings on the networked system 802 in an off-line manner, and to perform batch-mode communications between the programmatic client 808 and the networked system 802.

FIG. 8 also illustrates a third party application 828, executing on a third party server machine 830, as having programmatic access to the networked system 802 via the programmatic interface provided by the API server 814. For example, the third party application 828 may, utilizing information retrieved from the networked system 802, support one or more features or functions on a website hosted by the third party. The third party website may, for example, provide one or more promotional, marketplace or payment functions that are supported by the relevant applications of the networked system 802.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Electronic Apparatus and System

Example embodiments may be implemented in digital electronic circuitry, or in computer hardware, firmware, software, or in combinations of them. Example embodiments may be implemented using a computer program product, for example. a computer program tangibly embodied in an information carrier, for example, in a machine-readable medium for execution by, or to control the operation of, data processing apparatus (e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, for example, a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
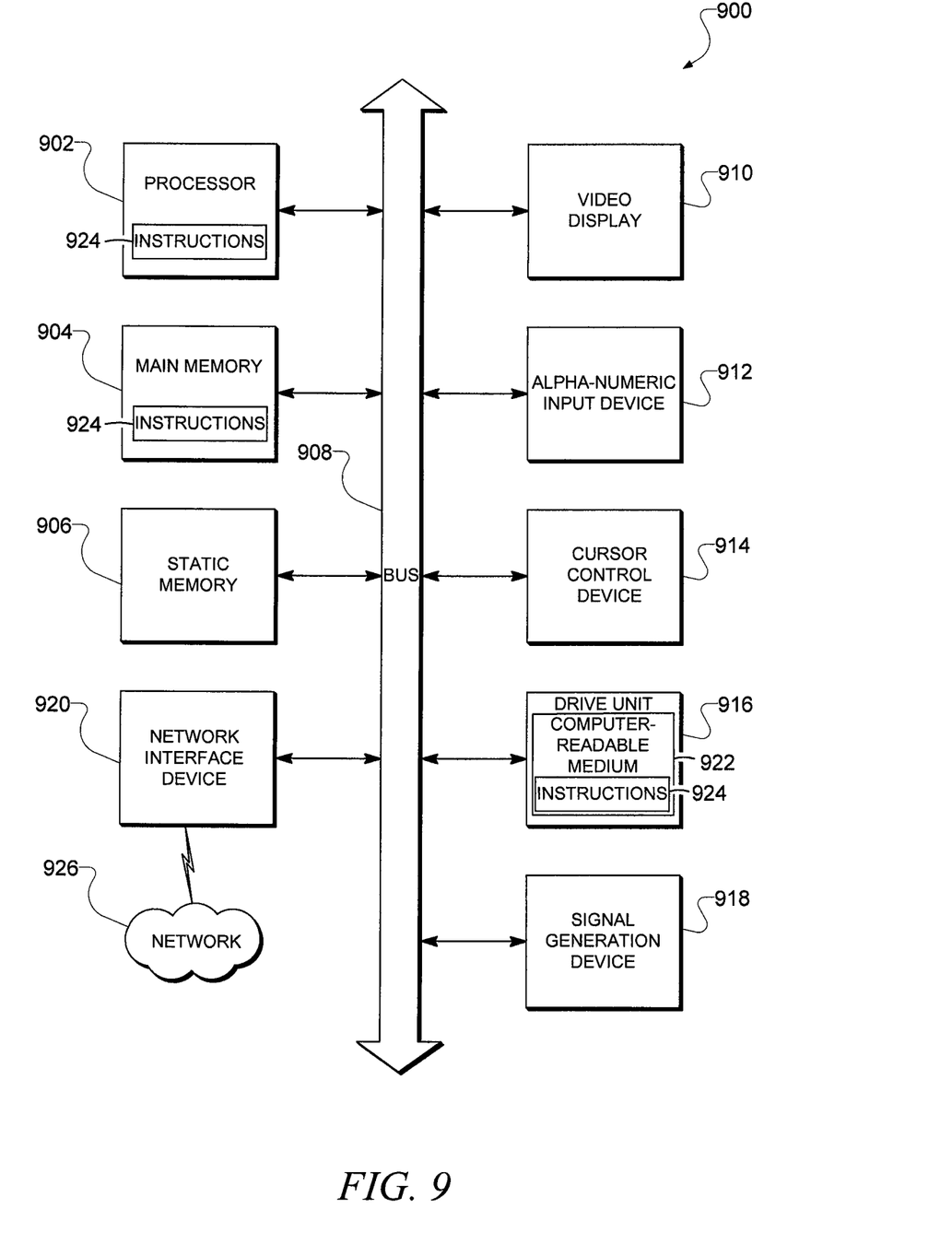
FIG. 9 is a block diagram of machine in the example form of a computer system within which a set instructions, for causing the machine to perform any one or more of the methodologies discussed herein may be executed.

FIG. 9 is a block diagram of machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   a processor;
   a policy module configured to receive a listing by a seller that describes an item for sale and that includes a permission to transform the listing provided by the seller to a marketplace upon review of the listing, the permission being indicated in the listing by a selection of an option of a set of options or by a value in a range of values, the policy module to determine that the listing does not comply with one or more marketplace policies of the marketplace, the one or more marketplace policies being based on one or more item characteristics or listing characteristics; and
   a presentation module implemented by the processor and configured, responsive to the determination that the listing does not comply with the one or more marketplace policies, to check the permission to transform the listing and, based on the permission, to transform the listing according to the one or more marketplace policies and to publish the transformed listing in the marketplace.

2. The system of claim 1, further comprising a forwarding module configured to identify one or more additional marketplaces to publish the listing, and to forward the listing to at least a portion of the one or more additional marketplaces.

3. The system of claim 2, wherein the forwarding module is further configured to determine that the seller of the listing has granted permission to the marketplace to forward the listing to the one or more additional marketplaces.

4. The system of claim 2, wherein the forwarding module is further configured to notify the seller of the listing that the listing was forwarded to the at least a portion of the one or more additional marketplaces.

5. The system of claim 1, wherein the marketplace is to access an item inventory of the seller of the listings and to determine an available quantity of the item.

6. The system of claim 5, wherein the marketplace is to remove the listing based on the available quantity being less than a pre-defined threshold.

7. The system of claim 6, wherein the marketplace is further to re-publish the listing based on subsequently determining that the available quantity is not less than the pre-defined threshold.

8. The system of claim 1, wherein the listing includes a selection of an option of a plurality of options and the policy module is further to determine that the selected option complies with the one or more marketplace policies.

9. The system of claim 1, wherein the listing includes a value of a range of values and the policy module is further to determine that the value complies with the one or more marketplace policies.

10. The system of claim 1, wherein the policy module is further configured to reject the listing if the listing does not comply with at least one of the one or more marketplace policies.

11. The system of claim 1, wherein the transformation of the listing includes re-sizing the listing as it appears in a graphical user interface (GUI) provided by the marketplace, reformatting the listing, or changing the appearance or layout of the listing.

12. The system of claim 1, wherein the transformation of the listing includes adding information, fields, or a product description to the listing.

13. The system of claim 1, wherein the transformation of the listing includes changing the price of the item for sale, adding a discount to the listing, or adding an incentive program to the listing.

14. The system of claim 1, wherein the policy module receives a further permission to transform the listing when the listing is delivered to the marketplace.

15. The system of claim 1, wherein the permission to transform the listing is granted by the seller upon receiving the transformed listing.

16. The system of claim 1, further comprising a store module configured to add the listing to a virtual store of the seller, the virtual store hosted by the marketplace.

17. The system of claim 16, wherein the store module is further configured to add information to the listing according to one or more store policies.

18. A method comprising:
   receiving a listing by a seller that describes an item for sale and that includes a permission to transform the listing provided by the seller to a marketplace upon review of the listing, the permission being indicated in the listing by a selection of an option of a set of options or by a value in a range of values;
   determining, using one or more processors, that the listing does not comply with one or more marketplace policies of the marketplace, the one or more marketplace policies being based on one or more item characteristics or listing characteristics;
   based on the listing not complying with the one or more marketplace policies, checking the permission to transform the listing, and, based on the permission, transforming the listing according to the one or more marketplace policies; and
   publishing the transformed listing in the marketplace.

19. A non-transitory machine-readable medium having instructions embodied thereon, the instructions executable by one or more machines to perform operations comprising:
   receiving a listing by a seller that describes an item for sale and that includes a permission to transform the listing provided by the seller to a marketplace upon review of the listing, the permission being indicated in the listing by a selection of an option of a set of options or by a value in a range of values;
   determining, using one or more processors, that the listing does not comply with one or more marketplace policies of the marketplace, the one or more marketplace policies being based on one or more item characteristics or listing characteristics;
   based on the listing not complying with the one or more marketplace policies, checking the permission to transform the listing, and, based on the permission, transforming the listing according to the one or more marketplace policies; and
   publishing the transformed listing in the marketplace.

* * * * *